Patented June 9, 1942

2,285,628

UNITED STATES PATENT OFFICE 2,285,628

METHOD OF PRODUCING A PURIFIED GUM ROSIN AND TURPENTINE FROM CRUDE OLEORESIN

William N. Traylor, Hattiesburg, Miss., assignor to Hercules Powder Company, Wilmington, Del., a corporation of Delaware No Drawing. Application April 7, 1938, Serial No. 200,679

4 Claims. (Cl. 260—109)

This invention relates to a method of producing a purified gum rosin and turpentine from crude oleoresin.

Crude oleoresin, from which gum rosin and gum spirits of turpentine are derived is obtained by scarifying the bark of the pine tree and catching the oleoresin which exudes, in a suitable metal cup. This crude oleoresin, as collected from the forest, is a viscous semi-crystalline mass contaminated with sand, wood chips, particles of bark, and various other kinds of foreign matter. Furthermore, this crude oleoresin is also unstable in its chemical composition, so that from the time it exudes from the tree it is undergoing various chemical changes. It is also corrosive in its action on the metal cups and consequently picks up further contamination.

Crude oleoresin is customarily subjected to heating in a fire still, thereby driving off the volatile components which are condensed and then marketed as gum spirits of turpentine. The residue remaining in the still is gum rosin and it is obvious that in such a procedure the various contaminants in the crude oleoresin will remain in the residue, thereby resulting in a low quality gum rosin.

In the past, attempts have been made to remove these impurities from the crude oleoresin by such methods as water washing, heating with subsequent filtration, acid treatments and solution or washing of the crude oleoresin in an excess of turpentine, as well as combinations of the above treatments. Although all of these treatments have some merit, none of them produce a rosin which is sufficiently purified to result in a substantially lighter grade.

Now I have found that I may produce a high grade gum rosin from the crude oleoresin obtained from the forest by treating the crude oleoresin with an organic solvent characterized by good solvent action for the said oleoresin but poor solvent action for the color bodies contained therein and no solvent action for the contaminants introduced during the collection of the oleoresin, separating the solution resulting from this treatment from the undissolved material suspended therein and evaporating the volatile components out of the said solution. The volatile components contained in the said solution are turpentine from the oleoresin and the organic solvent in which I dissolve the oleoresin. In practice I find that it is desirable to distill the volatile material out of the solution and at the same time fractionate the turpentine from the organic solvent I have used. Thus, in one operation I recover gum rosin as a residue and separate the gum turpentine from the organic solvent.

Among the organic solvents characterized by good solvent action for the crude oleoresin but poor solvent action for the color bodies contained therein and no solvent action for the contaminants introduced during the collection of the oleoresin are the chlorinated solvents, such as, for example, carbon tetrachloride, ethylene dichloride; aliphatic ketones, such as, for example, acetone; aliphatic alcohols, such as, for example, ethyl alcohol, methyl alcohol, butyl alcohol; ester type solvents, such as, ethyl acetate; aromatic hydrocarbons, such as, for example, benzene, toluene and xylene; hydrogenated petroleum solvents, such as, for example, those solvents referred to by the trade as Solvesso No. 1, Solvesso No. 2 and Solvesso No. 3; and petroleum type solvents, such as, for example, gasoline of various boiling ranges, petroleum ether, etc.

Although I have found that all of these organic solvents give an improvement in the grade of rosin obtained from the oleoresin, for the greatest improvement I prefer to use a petroleum type solvent such as gasoline. The boiling range of the particular cut of gasoline used should be so chosen that it can be easily removed by fractionation from the turpentine when the gasoline solution containing the oleoresin is distilled for the recovery of turpentine. For this purpose I have found that a gasoline having a boiling range from about 90° C. to about 120° C. is most satisfactory.

Turpentine, which has been used in the prior art as a solvent for oleoresin, has a relatively good solubility for the color bodies, for example, contained in the oleoresin. Hence, when the turpentine is removed by distillation of the oleoresin, the residue remaining, which is gum rosin, is contaminated with these color bodies and thus is of a considerably darker grade than when an organic solvent of the types above shown is used for dissolving the oleoresin. In addition, an organic solvent such as gasoline is not only more efficient in preventing the color bodies from getting into the rosin finally obtained from the crude oleoresin, but it also has the advantage that dirt and other extraneous matter settle out faster and more completely than they do in a turpentine solution.

In carrying out the method in accordance with my invention, crude oleoresin, obtained as an exudation by the scarification of the bark of the pine tree, is dissolved, for example, in gasoline, is allowed to stand for several minutes to permit settling, and is then filtered, centrifuged or treated in any other manner to remove the color-bodies and any other materials which are insoluble in the gasoline. The rosin is then recovered from this solution by subjecting it to a distillation to remove the volatile components with the separation of the gasoline and turpentine present in the volatile phase by fractional distillation. The gasoline so obtained may then be re-used in the process. In place of gasoline I may use any other light petroleum hydrocarbon or any of the other organic solvents before listed.

In carrying out my method I may also, if desirable, first filter the crude oleoresin in order to remove extraneous matter such as dirt, sticks, etc., and then dissolve this filtered oleoresin in one of the organic solvents shown and proceed in the manner indicated above.

As an example of the carrying out of my process according to my invention, I take a sample of the crude oleoresin, filter off extraneous matter such as, dirt, sticks, etc., and dissolve the material in an equal amount of gasoline. After the rosin is dissolved, and the solution has been allowed to settle, it is again filtered, thereby removing a substantial amount of the insoluble color-bodies. The rosin is then reclaimed from the solution by evaporation of the volatile components. The color of the rosin before and after treatment is as follows:

|  | Lovibond | Grade |
|---|---|---|
| Color of rosin recovered directly from oleoresin. | 80.0 A+165.0 R | E |
| Color of rosin from gasoline solution of oleoresin recovered as indicated above. | 40.0 A+5.5 R | H |

As a further example I have taken a sample of crude oleoresin of a relatively high quality and prepared solutions in gasoline and turpentine, respectively, containing 20% by weight of recoverable rosin. The terpenes originally present in the crude oleoresin were not removed prior to the solution of oleoresin in either gasoline or turpentine. After solution has occurred, the solution is filtered as before to remove the insoluble color-bodies and any other insoluble material and the rosin is then reclaimed. The color of the rosin reclaimed from the turpentine and the gasoline solution is shown in the following table:

| Color of rosin from turpentine solution (Lovibond) | Grade | Color of rosin from gasoline solution (Lovibond) | Grade |
|---|---|---|---|
| 40.0A+0.0R | N | 15.0A+0.0R | X |

As a further example of the refining of crude oleoresin, samples of the crude material were dissolved in a narrow boiling range gasoline in place of the regular gasoline above used. A gasoline such as this has the advantage of ease of fractionation in the subsequent recovery of the volatile materials. The gasoline used in this instance has a boiling range, according to the A. S. T. M. distillation method, of 94° C. to 119° C. Samples of crude gum oleoresin were selected and approximately 20% solutions (on the basis of the rosin recoverable from the oleoresin) prepared by dissolving the crude material in both turpentine and the narrow boiling range gasoline. These solutions were settled for about 30 minutes, filtered, and the rosin reclaimed from the filtered solution by evaporation of the volatile components. The results obtained are shown in the following table:

| Test No.— | Color of rosin reclaimed from turpentine solution (Lovibond) | Grade | Color of rosin reclaimed from narrow boiling range gasoline (Lovibond) | Grade |
|---|---|---|---|---|
| 1 | 40.0A+2.5R | I | 40.0A+0.0R | M |
| 2 | 40.0A+2.5R | I | 40.0A+0.5R | M |
| 3 | 40.0A+1.75R | K | 40.0A+0.25R | M |
| 4 | 40.0A+2.0R | I | 40.0A+0.25R | M |
| 5 | 40.0A+1.0R | K | 40.0A+0.0R | M |
| 6 | 40.0A+2.5R | I | 40.0A+0.5R | M |
| 7 | 40.0A+1.0R | K | 40.0A+0.0R | M |
| 8 | 40.0A+2.75R | I | 40.0A+0.5R | M |
| 9 | 40.0A+0.5R | M | 40.0A+0.0R | M |
| 10 | 40.0A+4.0R | I | 40.0A+1.0R | K |
| 11 | 40.0A+5.5R | H | 40.0A+1.5R | K |
| 12 | 40.0A+0.25R | M | 40.0A+0.0R | M |
| 13 | 40.0A+1.25R | K | 40.0A+0.0R | M |
| 14 | 40.0A+0.25R | M | 40.0A+0.0R | M |

As an example of the use of various solvents in my process, the data shown below were obtained. These results were obtained by using one master sample of the crude oleoresin. This master sample was strained through a wire strainer of about 1/16 inch mesh, and thoroughly stirred to secure a uniform sample. The color of the rosin produced from the different solvents as compared with turpentine was obtained by dissolving 75 parts by weight of the master sample of the crude oleoresin in 185 parts by weight of the given solvent. All of these samples were dissolved at room temperature. The crude oleoresin solution was then filtered thru a filter paper and the rosin reclaimed therefrom in the presence of carbon dioxide, by evaporating off the volatile components.

| Solvent | Color of rosin reclaimed (Lovibond) | Grade |
|---|---|---|
| Master color (from turpentine solution) | 40.0A+3.75R | H |
| Carbon tetrachloride | 40.0A+1.00R | K |
| Wood alcohol | 40.0A+1.50R | K |
| N. butyl alcohol | 40.0A+0.25R | M |
| Hydrogenated petroleum solvent (Solvesso No. 1) | 40.0A+1.50R | K |
| Hydrogenated petroleum solvent (Solvesso No. 2) | 40.0A+1.25R | K |
| Hydrogenated petroleum solvent (Solvesso No. 3) | 40.0A+1.25R | K |
| Ethylene dichloride | 40.0A+1.50R | K |
| Ethyl acetate | 40.0A+1.25R | K |
| Petroleum ether | 40.0A+0.25R | M |
| Narrow boiling range gasoline | 40.0A+0.50R | M |

It will be noted that in each of the above tests there is an improvement in the color of the rosin from the various solvents over that obtained from the same rosin reclaimed from turpentine solution. The results shown indicate that the rosin produced in accordance with my invention is of high grade and in particular is relatively free from color-bodies and other impurities which give a dark color to the rosin, and which, to the best of my knowledge, have not been removed to a similar extent in processes heretofore used.

In connection with the operation in accordance with the method of my invention, it will be understood that the operable boiling range for the solvent suitable in my process, may be made quite broad, depending upon the desired degree of fractionation of the solvents in the subsequent recovery thereof. For most efficient operation, I prefer using a gasoline having a boiling range of about 90° C. to about 120° C.

It will furthermore be understood that I do not limit myself to any particular apparatus for performing my process nor to the use of any particular temperature in such treatment, nor to the use of any particular concentrations of the reactants, because it is obvious that different samples of the crude oleoresin may require various modifications of the same.

It will also be understood that the examples given above are by way of illustration only, and that in the operation of my process in accordance with this invention, I am not limited thereto, except as hereinafter provided in the claims.

What I claim and desire to protect by Letters Patent is:

1. In a method of producing a high grade pine oleoresin from crude pine oleoresin, the improvement which comprises the steps of dissolving the pine oleoresin in at least an equal amount of a liquid consisting of a light petroleum hydrocarbon and separating the solution from the undissolved components.

2. In a method of producing a high grade pine oleoresin from crude pine oleoresin, the improvement which comprises the steps of dissolving the pine oleoresin in at least an equal amount of a liquid consisting of a light hydrogenated petroleum hydrocarbon and separating the solution from the the undissolved components.

3. In a method of producing a high grade pine oleoresin from crude pine oleoresin, the improvement which comprises the steps of dissolving the pine oleoresin in at least an equal amount of a liquid consisting of gasoline and separating the solution from the undissolved components.

4. In a method of producing a high grade pine oleoresin from crude pine oleoresin, the improvement which comprises the steps of dissolving the pine oleoresin in a liquid consisting of at least an equal amount of gasoline having a boiling range from about 90° C. to about 120° C. and separating the solution from the undissolved components.

WILLIAM N. TRAYLOR.